Patented Sept. 2, 1941

2,254,904

UNITED STATES PATENT OFFICE 2,254,904

CELLULOSE DERIVATIVES, POLYVINYL COMPOUNDS, OR POLYMERIZED ACRYLIC ESTERS

William Henry Moss, London, England, assignor to Celanese Corporation of America, a corporation of Delaware No Drawing. Application February 26, 1938, Serial No. 192,791. In Great Britain March 4, 1937

13 Claims. (Cl. 106—189)

This invention relates to halogen-containing compounds suitable for use in compositions containing cellulose derivatives, polyvinyl resins and other base materials, to synthetic resins formed from said compounds and to compositions containing the halogen-containing compounds or synthetic resins formed from them.

The halogen-containing compounds of the invention are halogen substitution products of poly-nuclear phenols such as diphenylol propane and can be represented by the formula

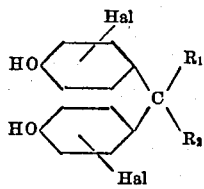

where $R_1$ and $R_2$ are hydrogen atoms or aliphatic groups. These compounds provide a new class of plasticisers for cellulose derivatives, polyvinyl resins and like materials.

Suitable halogen substitution products are the di- and tetra-chlor derivatives of di(4-hydroxyphenyl)dimethyl-methane, and especially di(3-chlor,4-hydroxyphenyl)dimethyl-methane, di(4-hydroxy,3-5-dichlorphenyl) dimethyl-methane and di(4-hydroxy,3-5-dibromphenyl)dimethyl-methane. Halogen substitution products of other compounds containing two hydroxyphenyl groups attached to an aliphatic grouping are also suitable, for instance products derived from di(4-hydroxyphenyl)methyl-methane, di(4-hydroxyphenyl)ethyl-methane, di(4-hydroxyphenyl)-methyl-ethyl-methane, di(4-hydroxyphenyl)propyl-methane, di(4-hydroxyphenyl)dipropyl-methane, 1,1-di(4-hydroxyphenyl) cyclohexane and di(4-hydroxy-phenyl)phenyl-methane. Examples of halogen substitution products of these compounds are di(4-hydroxy, 3-5-dichlorphenyl) methyl-methane, di(4-hydroxy-3-chlorphenyl) methyl methane, di(4-hydroxy,3-5-dichlorphenyl) ethyl-methane, di(4-hydroxy,3-5-dichlorphenyl)methyl-ethyl-methane and di(4-hydroxy,3-5-dichlorphenyl)propyl-methane, and the corresponding bromine compounds.

The halogen substitution products of the present invention may be prepared by direct halogenation of the corresponding poly-nuclear phenolic compound. For example, chlorine derivatives may be made by passing chlorine into a solution of the corresponding poly-nuclear phenolic compound in a suitable solvent, e. g. glacial acetic acid or other lower fatty acid, or into a suspension of the compound in an inert non-solvent for instance, a liquid chlorinated hydrocarbon such as ethylene dichloride for instance at a temperature of from 20 to 50° C., until the desired increase in weight is obtained. The desired halogen-containing compound may be crystallised out from the reaction mixture or precipitated by the addition of water, and recrystallised from a suitable solvent, e. g. dilute acetic acid.

It will be observed that the compounds instanced above do not contain halogenated side chains. Compounds with halogenated side-chains may, however, be formed especially if halogenation be effected at relatively high temperatures such compounds usually possess lacrymatory properties and are generally less suitable as plasticisers than compounds free from halogenated side-chains. With a view to confining halogenation as far as possible to the phenolic nuclei it is of advantage to carry out halogenation at relatively low temperatures, e. g. 0–50° C. and especially 10–20 or 30° C. Compounds which are halogenated in a side-chain are not, however, excluded from the scope of the invention and it appears probable that the product of Example 5 below has undergone some halogenation in the methyl groups probably of those attached to the benzene rings.

Cellulose derivative compositions which are light-fast, of reduced inflammability, and relatively impermeable to water can be made using the halogenated compounds of the invention as plasticisers. Furthermore, films may be formed from cellulose derivatives and the halogenated compounds, having a wet-strength nearly as great as the dry-strength. Fabrics treated with solutions containing cellulose derivatives and the compounds have a greatly improved resistance to moisture, and such solutions are therefore particularly suitable for use as aeroplane fabric dopes which enable the production of an aeroplane fabric which does not lose tautness when exposed to humid conditions. A suitable aeroplane fabric dope is one containing cellulose acetate, di(4-hydroxy,3-5-dichlorphenyl)dimethyl-methane and aluminium powder.

The compositions of the invention may contain any suitable proportion of the plasticiser, for instance 20 to 40, 50 or 100% of the weight of the cellulose acetate or other base material present. The compositions may also contain other plasticisers, synthetic resins, pigments, dyes, effect materials and other substances, and the exact amount of plasticiser required will depend to some extent upon the pigments, fillers and other substances present in the composition.

The halogen substitution products and particularly those in which each of the benzenoid nuclei is unsubstituted in a position ortho to the hydroxy group as for example in the di(3-chlor,4-hydroxyphenyl) compounds, may be reacted with aldehydes, e. g. acetaldehyde furfural benzaldehyde and particularly formaldehyde, to form synthetic resins, and these resins are also of value for incorporation in compositions containing cellulose derivatives and the like. Such a resin may be produced by reacting di(4-hydroxy-3-chlorphenyl)dimethyl-methane with formaldehyde in the presence or absence of a catalyst.

The halogen-containing compounds of the present invention, as well as their condensation products with aldehydes, may be incorporated in compositions containing nitrocellulose, organic esters of cellulose, for instance cellulose acetate, cellulose formate, cellulose propionate and cellulose butyrate, and cellulose ethers, for instance methyl cellulose, ethyl cellulose and benzyl cellulose. They may also be incorporated in compositions containing other base materials, especially other polymeric film-forming esters and ethers, for instance polymerised vinyl acetate, chloride and chloracetate and the similar substances derived from acrylic acid and alkyl substituted acrylic acids, and vinyl ethers.

The following examples illustrate the invention:

*Example 1*

1000 gms. of diphenylol propane is dissolved in 5250 gms. of glacial acetic acid. Chlorine is passed into this solution at a temperature of about 35° C. until the weight of the reaction mixture has been increased by about 8%. On the addition of water to the reaction mixture a precipitate is obtained which yields on recrystallisation from dilute acetic acid a white crystalline compound of melting point 57° C. This compound is very compatible with cellulose acetate and is substantially light-fast.

*Example 2*

100 gms. of diphenylol propane is dispersed in 50 gms. of ethylene dichloride and chlorine is passed into the suspension at 10–20° C. until the weight of the reaction mixture has increased by 50 gms. The product is filtered off and recrystallised from dilute acetic acid. About 95 gms. is obtained of a compound melting at about 127° C. From the percentage of chlorine in the compound and the fact that it does not condense with formaldehyde this is thought to be di(4-hydroxy, 3-5-chlorphenyl) dimethyl methane.

*Example 3*

Chlorination is effected as described in Example 2, but employing the diphenylol propane in solution in glacial acetic acid and having present as catalyst 0.002–0.02% on the weight of the diphenylol propane of aluminium chloride or ferric chloride. A substance, thought to be a tetrachlordiphenylol propane, of melting point about 133° C. is obtained.

*Example 4*

The reaction is carried out as described in Example 1, except that chlorine is passed until a weight increase equal to 200% on the weight of the diphenylol propane is obtained. A product identical with that of Example 2 crystallises from the reaction mixture without the addition of water. This product is filtered off. A needle-shaped crystalline compound, melting at about 66° C. separates from the filtrate. This compound is highly compatible with cellulose acetate.

*Example 5*

100 gms. of di-ortho-cresylol propane is dissolved in 500 gms. of glacial acetic acid and chlorine is passed through the solution until an increase in weight of 100 gms. is obtained. On dilution of the reaction mixture with water a soft resinous mass melting at about 45° C. and compatible with cellulose acetate is obtained.

*Example 6*

1200 gms. of the compound obtained according to Example 1 is heated under reflux with 300 ccs. of 40% formaldehyde solution and 1 cc. of phosphoric acid. A light yellow resin separates. This is washed with hot water and with dilute sodium carbonate solution and then again with water. It is fused to form a clear, light yellow resin of melting point about 65° C. soluble in acetone and compatible with cellulose acetate.

*Example 7*

100 gms. of the resin of Example 5 is heated under reflux with 100 ccs. of 40% formaldehyde and a little phosphoric acid for about 20 hours. A hard resin having a melting point of about 65° C. and incompatible with cellulose acetate is obtained.

*Example 8*

A lacquer for wood or metal has the following composition:

| | Grams |
|---|---|
| Cellulose acetate | 200 |
| Fused resin of Example 6 | 200 |
| Titanium dioxide | 150 |
| Zinc oxide | 50 |
| Ethyl toluene sulphonamide | 50 |
| Acetone | 1000 |
| Alcohol | 500 |
| Benzene | 500 |
| Methyl ethyl ketone | 500 |
| Ethyl lactate | 150 |

*Example 9*

A film is produced by flowing or spreading the following composition:

| | Grams |
|---|---|
| Cellulose acetate | 1000 |
| Fused resin of Example 5 | 50–250 |
| Actone | 1000 |

*Example 10*

A moulding composition has the following composition:

| | Grams |
|---|---|
| Cellulose acetate | 1000 |
| Fused resin of Example 5 | 400 |
| Triacetin | 50–250 |

The triacetin can be replaced by the chlorinated phenylol propanes of Example 1, 2 or 3 and the cellulose acetate can be replaced by nitrocellulose, polyvinyl acetate, benzyl cellulose or ethyl cellulose.

Example 11

A foil of thickness 0.001-0.005" is flowed from a solution of the following composition:

|  | Grams |
|---|---|
| Cellulose acetate | 1000 |
| Product of Example 1, 2 or 3 | 500 |
| Acetone | 4000 |

By reducing the amount of acetone as required, the resulting composition can be used in the preparation of thicker sheets. The cellulose acetate can be replaced by polyvinyl acetate, benzyl cellulose, ethyl cellulose or nitrocellulose.

Example 12

A film is made as described in Example 11 but replacing the cellulose acetate by the resinous substance known as "Plextol A" and employing instead of acetone a mixture of 3 parts by volume of benzene to 1 of acetone.

Example 13

A solution suitable for use as an aeroplane dope has the following composition:

|  | Grams |
|---|---|
| Cellulose acetate or nitrocellulose | 1000 |
| Product of Example 1, 2 or 3 | 150 |
| Tricresyl phosphate or triphenyl phosphate | 50 |
| Dimethoxy ethyl phthalate | 50 |
| Powdered aluminium or a pigment | 50-200 |
| Acetone | 4000 |
| Methyl ethyl ketone | 2000 |
| Alcohol | 2000 |
| Benzene | 2000 |
| Diacetone alcohol | 500 |
| Cyclohexanone | 200 |

Example 14

A moulding powder has the following composition:

|  | Parts by weight |
|---|---|
| Cellulose acetate or nitrocelulose | 100 |
| Product of Example 1, 2 or 3 | 30-42 |

The plasticiser, i. e. the product of Example 1, 2 or 3 is introduced by direct mixing or ball-milling or in solution in alcohol or in suspension in water.

Example 15

A dope adapted for forming a flexible coating for electric cables has the following composition:

| Cellulose acetate | gms | 1000 |
|---|---|---|
| Glyacon | gms | 700 |
| Product of Example 1 | gms | 700 |
| Methyl ethyl ketone | ccs | 300 |
| Acetone | gms | 1000 |

Example 16

A lacquer contains the following solid constituents:

|  | Parts by weight |
|---|---|
| Cellulose acetate or nitrocellulose | 10 |
| Natural or synthetic resin | 12 |
| Product of Example 1, 2 or 3 | 6 |

These constituents are dissolved in the solvent mixture of Example 13 and any desired pigments, fillers or the like are added.

Example 17

A wood lacquer contains the following solid constituents:

|  | Parts by weight |
|---|---|
| Cellulose acetate or nitrocellulose | 5 |
| Product of Example 1, 2 or 3 | 5 |
| Product of Example 4 | 1 |

These constituents are dissolved in the solvent mixture of Example 13. If desired the product of Example 4 may replace that of Example 1, 2 or 3.

Having described my invention, what I desire to secure by Letters Patent is:

1. A composition of matter containing a substance selected from the group consisting of cellulose esters, cellulose ethers, polyvinyl esters, polyvinyl ethers and polymerized alkyl substituted acrylic acid esters and di-(4-hydroxy-3-chlorphenyl)-dimethyl-methane.

2. A composition of matter containing cellulose acetate and di-(4-hydroxy-3-chlorphenyl)-dimethyl-methane.

3. A composition of matter containing a substance selected from the group consisting of cellulose esters, cellulose ethers, polyvinyl esters, polyvinyl ethers and polymerized alkyl substituted acrylic acid esters and di-(4-hydroxy,3-5-dichlorphenyl)dimethyl methane.

4. A composition of matter containing cellulose acetate and di-(4-hydroxy-3-5-dichlorphenyl)-dimethyl methane.

5. A composition of matter containing a substance selected from the group consisting of cellulose esters, cellulose ethers, polyvinyl esters, polyvinyl ethers and polymerized alkyl substituted acrylic acid esters, and di-(4-hydroxy,3-5-dibrom)dimethyl-methane.

6. A composition of matter containing cellulose acetate and di-(4-hydroxy,3-5-dibrom)-dimethyl-methane.

7. A composition of matter containing a substance selected from the group consisting of cellulose esters, cellulose ethers, polyvinyl esters, polyvinyl ethers and polymerized alkyl substituted acrylic acid esters, together with a substance of the composition

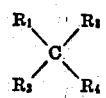

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are halogenated para-phenylol groups.

8. A composition of matter containing a substance selected from the group consisting of cellulose esters, cellulose ethers, polyvinyl esters, polyvinyl ethers and polymerized alkyl substituted acrylic acid esters, together with a substance of the composition

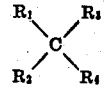

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are chlorinated para-phenylol groups.

9. A composition of matter containing cellulose acetate together with a substance of the composition

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are chlorinated para-phenylol groups.

10. A composition of matter containing a substance selected from the group consisting of cellulose esters, cellulose ethers, polyvinyl esters, polyvinyl ethers and polymerized alkyl substituted acrylic acid esters, together with a substance of the composition

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are mono-halogenated para-phenylol groups.

11. A composition of matter containing cellulose acetate together with a substance of the composition

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are mono-chlorinated para-phenylol groups.

12. A composition of matter containing a substance selected from the group consisting of cellulose esters, cellulose ethers, polyvinyl esters, polyvinyl ethers and polymerized alkyl substituted acrylic acid esters, together with a substance of the composition

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are di-halogenated para-phenylol groups.

13. A composition of matter containing cellulose acetate together with a substance of the composition

wherein $R_1$ and $R_2$ are selected from the group consisting of hydrogen atoms, unsubstituted univalent hydrocarbon residues and groups which together with the carbon atom form a cycloaliphatic hydrocarbon residue and $R_3$ and $R_4$ are di-chlorinated para-phenylol groups.

WILLIAM HENRY MOSS.